United States Patent [19]

Kesselring

[11] 4,193,727
[45] Mar. 18, 1980

[54] WORKPIECE STORING AND HANDLING APPARATUS

[75] Inventor: Wolfgang Kesselring, Torrington, Conn.

[73] Assignee: Jamieson Manufacturing Company, Inc., Torrington, Conn.

[21] Appl. No.: 882,947

[22] Filed: Mar. 2, 1978

[51] Int. Cl.² ............................................. B65G 47/90
[52] U.S. Cl. ..................................... 414/223; 83/417; 198/485; 414/225; 414/728; 414/738; 414/742
[58] Field of Search ............... 198/485, 489, 486, 339; 214/1 B, 1 BS, 1 BB, 1 BT, 1 BC, 1 BH, 1 BD, 1 BV, 146.5, 148, 147 T, 309, 1 QF; 83/417; 414/567, 737, 222, 223, 728, 738–741, 742

[56] References Cited

U.S. PATENT DOCUMENTS

| | | | |
|---|---|---|---|
| 2,833,434 | 5/1958 | Stover et al. | 198/486 X |
| 3,653,293 | 4/1972 | Wallis | 214/1 BB X |
| 3,770,098 | 11/1973 | Baugnies et al. | 214/1 BD X |
| 3,841,499 | 10/1974 | Bullard | 214/1 BD |
| 4,126,233 | 11/1978 | Jeske | 214/1 BD X |

*Primary Examiner*—Frank E. Werner
*Attorney, Agent, or Firm*—McCormick, Paulding & Huber

[57] ABSTRACT

A workpiece storing and handling apparatus particularly adapted for loading parts in a multiple spindle chucking machine wherein the spindles and chucks are indexible successively to a transfer station. A rotary part table has a circumaxial series of part receiving rests and is indexed to move the parts to a transfer station in succession. A gripper on a transfer arm engages a part at the transfer station and swings the same in a composite arcuate motion to a ready position in horizontal alignment with a chuck at the machine transfer station. The arm and gripper then move the part linearly in a horizontal plane to the open chuck and return to the ready position for arcuate return movement to the table transfer station. A transfer arm support shaft is swingable through an arc in a vertical plane by a fluid operable cylinder and is simultaneously rotated about its axis by a bevel gear arrangement to provide the required composite arcuate motion of the arm. A housing mounting the shaft and bevel gears is translatable by a second fluid cylinder along a horizontal slide rod arrangement to provide the required linear movement of the arm and gripper from the ready position to the load position adjacent the chuck. A discharge chute has a hinged end section beneath the chuck for receiving parts from the chuck and the hinged section is swingable downwardly for chuck clearance during indexing of the chucks.

19 Claims, 5 Drawing Figures

WORKPIECE STORING AND HANDLING APPARATUS

BACKGROUND OF THE INVENTION

Automatic multiple spindle chucking machines of the Acme Gridley, New Britain, Connomatic, Schutte, Gildemeister, and other similar machines have workholders of the chuck, collet, or like type associated respectively with their spindles for selectively holding and releasing workpieces. Thus, a plurality of workpieces or parts are accommodated and the machine work holders are indexed successively through several machining stations to a transfer station. At the transfer station, the workpieces or parts are loaded and unloaded with the chucks or collets operating automatically. The machines are adapted for relatively high rates of production and are efficient in their operation. The part loading and unloading operations, however, have been carried out manually in the past and ordinarily require one operator per machine.

It is a general object of the present invention to provide a workpiece storing and handling apparatus adapted to load and/or unload workpieces or parts in a multiple work holder machine in a fast and efficient operation, the apparatus including a magazine for storing a plurality of like workpieces or parts and adapted for manual loading so that a single operator can handle two or more multiple work holder machines.

It is a further object of the present invention to provide apparatus of the type mentioned wherein a workpiece transfer arm is operable between a transfer station at the workpiece magazine, a ready position, and a transfer station at a machine work holder, the arm being movable in a composite arcuate motion between the magazine and the ready position and movable linearly between the ready position and the work holder transfer station whereby to both properly position and orient a workpiece at each of the three positions.

A still further object of the present invention is to provide an apparatus of the type mentioned wherein cooperative motion transmitting means and power operating means associated with the transfer arm provide for the necessary composite arcuate arm motion through a simple and efficient mechanism which simultaneously rotates the arm about two discrete axes.

A still further object of the invention resides in the provision of an apparatus of the type mentioned wherein a single fluid cylinder is adapted to provide transfer arm movement about both discrete axes simultaneously.

A still further object of the invention is to provide an apparatus of the type mentioned which is adapted for both loading and unloading workpieces or parts in a multiple work holder machine.

A still further object of the invention is to provide apparatus of the type mentioned which is wholly self-powered and self-contained and portable and adapted to be readily connected and disconnected from a multiple work holder machine.

SUMMARY OF THE INVENTION

In fulfillment of the foregoing objects, a workpiece storing and handling apparatus is provided with a workpiece magazine having a plurality of workpiece receivers for storing a plurality of like workpieces. A means is provided for rotatably indexing the magazine to successively move the receivers through a plurality of stations in a planar path which is displaced from the planar path of movement of work holders in an associated multiple work holder machine. At least one of the receiver stations is a workpiece transfer station and has an operatively associated workpiece transfer arm. The transfer arm has a free end portion which is swingable through a composite arc between a first transfer position adjacent the receiver transfer station and an intermediate or "ready" position which is spaced horizontally from a work holder transfer station but which is in alignment with the latter station for linear movement toward and away from a second transfer position adjacent thereto. A workpiece gripper disposed at the free end portion of the transfer arm is operable selectively to grip and release workpieces for transport between the two transfer stations and the ready position and for transfer at the stations. Operatively associated with an opposite end portion of the transfer arm are cooperative motion transmitting and power operating means. The motion transmitting means is operable to rotate the arm about two discrete and angularly displaced axes in movement of its free end portion between said first transfer position and the ready position. The gripper at the free end portion of the arm is thus oriented at the first transfer position so as to face the plane of movement of the receiver stations and is oriented at the ready position so as to face the plane of movement of the work holders. The motion transmitting means is further operable by the motion transmitting and power operating means to effect precise linear movement of the free end portion of the transfer arm and the gripper between the ready position and the second transfer position adjacent the work holder transfer station. During such movement the orientation of the arm free end portion and the gripper is fixed to maintain workpiece or part orientation for loading or unloading at the work holder transfer station.

The motion transmitting and power operating means provide for the necessary transfer arm movement through a support shaft and gear arrangement wherein the shaft is swung bodily about a fixed axis and rotated about its own moving axis, the two actions occurring simultaneously to provide the necessary composite arcuate motion of the transfer arm and its workpiece gripper. Translation of the support shaft and along the fixed axis is also provided for to effect the necessary linear movement of the transfer arm and gripper to and from the work holder transfer station.

The apparatus may be employed for loading and/or unloading operations and when it is used as a workpiece or parts loader, an independent unloading means may be included. The unloading means may comprise a discharge chute having a movable end portion adjacent and work holder transfer station. The end portion has operative and inoperative positions respectively for receiving and discharging parts and for providing clearance for indexing movement of the work holders.

The apparatus is preferably self-powered and self-contained for portability and ready connect and disconnect means are provided for interengagement between the apparatus and a multiple work holder machine.

DESCRIPTION OF THE PREFERRED EMBODIMENT

Figure 1:
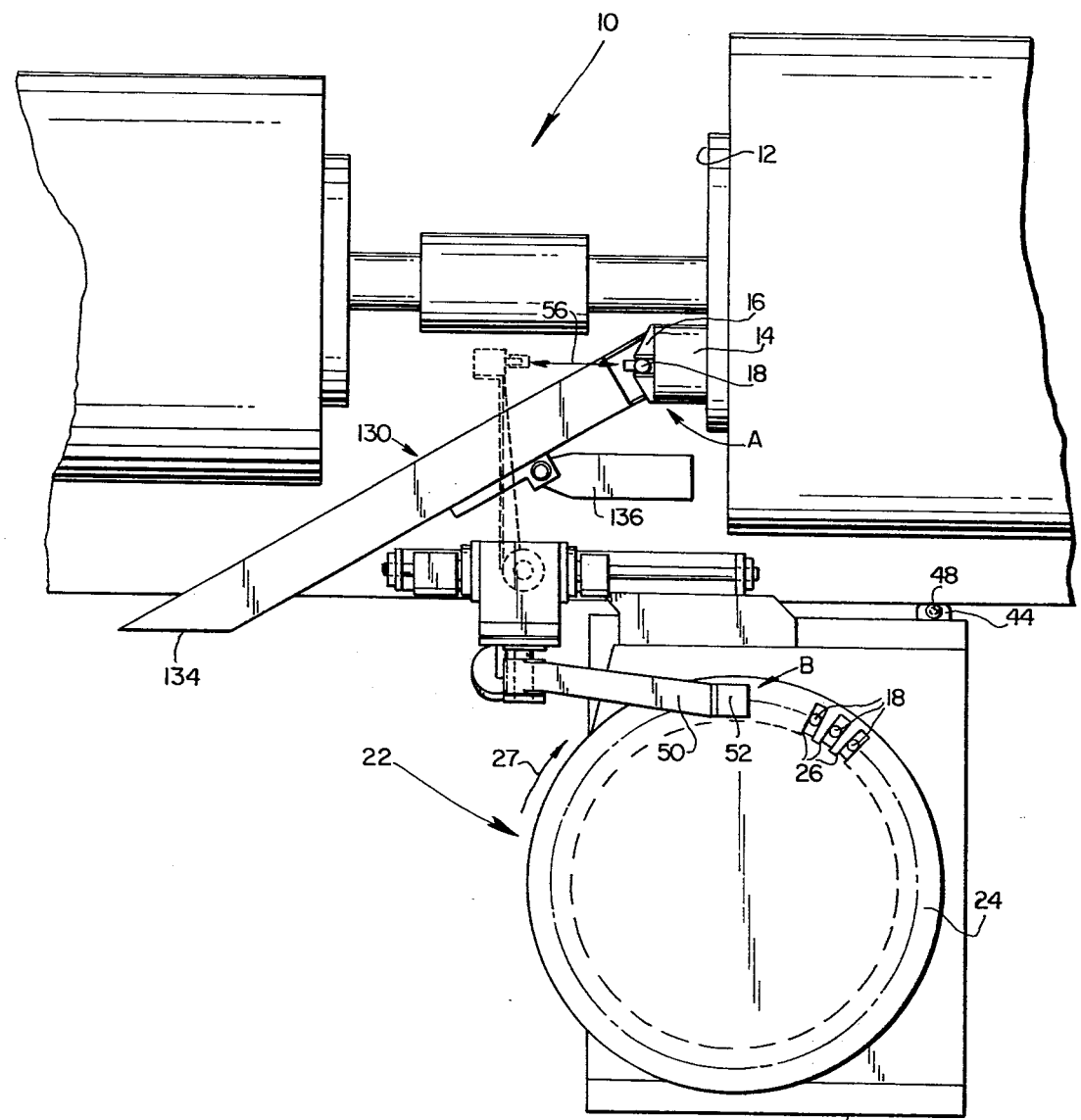
FIG. 1 is a somewhat schematic top view of the workpiece storing and handling apparatus of the present invention in operative association with a multiple spindle chucking machine.
Figure 2:
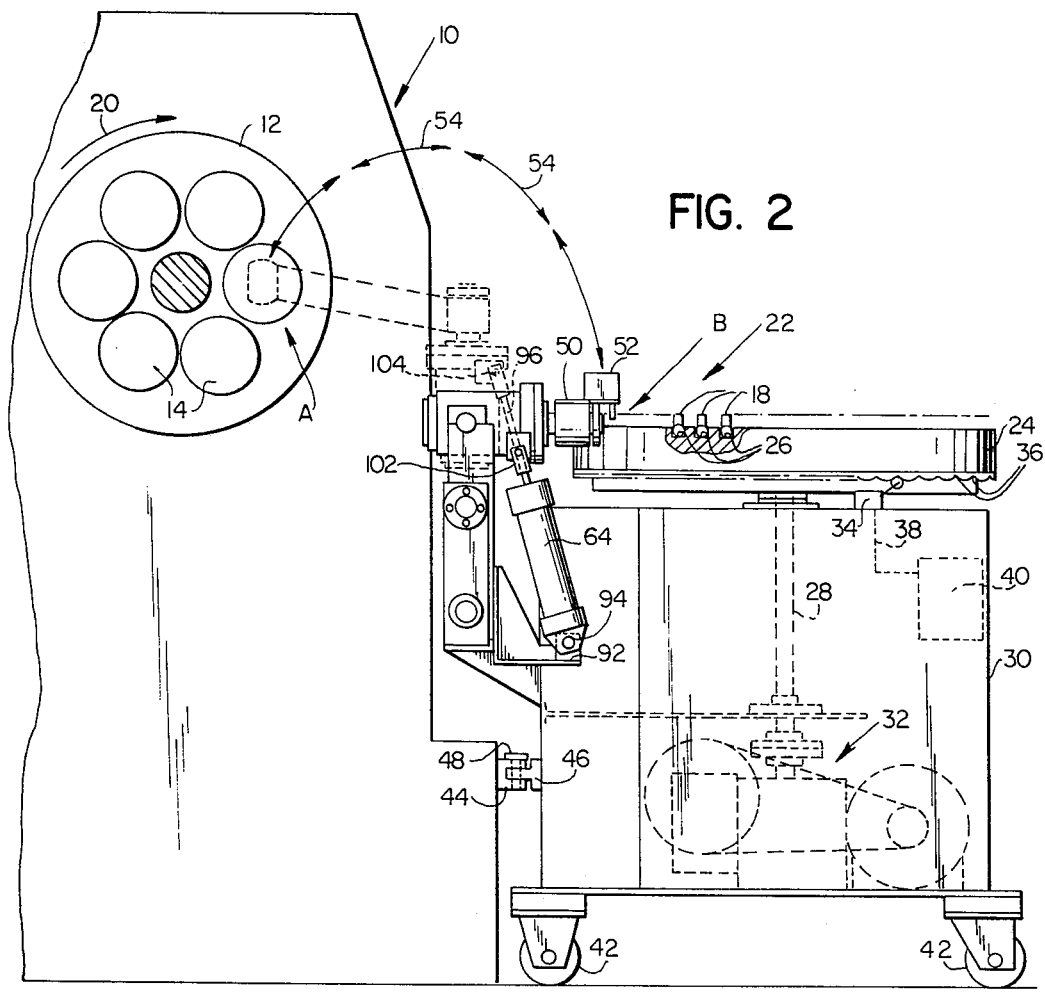
FIG. 2 is a somewhat schematic side elevational view of the workpiece storing and handling apparatus of FIG. 1 with the multiple spindle chucking machine illustrated schematically in vertical section.

Referring particularly to FIGS. 1 and 2, a multiple spindle chucking machine is indicated generally at 10 and illustrated schematically. The machine may be assumed to be of the well known Acme-Gridley type and includes a turret 12 indexible in a vertical plane of movement and carrying a plurality of spindles and chucks. A single spindle and chuck assembly 14 in FIG. 1 is illustrated at a transfer station A and includes a chuck illustrated schematically at 16 and holding a workpiece or part 18. The chuck 16 may be conventional with alternative hold and release conditions for transferring the workpiece 18 at the transfer station A. As shown, the transfer station A is both a loading and an unloading station for workpieces or parts such as 18. The operation of an Acme-Gridley multiple spindle chucking machine is well known and includes the successive indexing movement of the spindles and chucks through a circular path in a vertical plane, the turret 12 being conventionally moved through equal angular indexing movements. In FIG. 2 six (6) spindle and chuck assemblies are illustrated schematically at 14, 14 and each such assembly may hold a part for successive machining operations at the various stations in the path of movement of the spindles and chucks, clockwise indexing movement being indicated by the arrow 20. The machine is automatically controlled in a conventional manner in its turret indexing movements and in its machining operations. When a single transfer station is provided for as at A, a part such as 18 is automatically released by a chuck 16 at the transfer station and a succeeding part is entered in the chuck and held thereby for subsequent indexing of the turret and for machining of the part. Conventionally, part loading and unloading operations are carried out manually as mentioned and a single operator is assigned to each machine.

A workpiece or part storing and handling apparatus constructed in accordance with the present invention and indicated generally at 22 in FIGS. 1 and 2 is adapted particularly for use with an Acme-Gridley multiple spindle chucking machine of the type illustrated and described but the present invention is not to be regarded as so limited. The apparatus is equally adaptable for use with other multiple spindle machines of the type mentioned above, with machines having a plurality of fixed rather than rotatable work holders, and with machines having single work holders of the fixed or rotatable type. For example, the apparatus may be readily used with single spindle chucking machines such as Warner and Swasey and Ackworthie. Similarly, the type of work holder employed is not a limiting factor. The apparatus may be used with work holders of the chuck, collet, magnetic and other types capable of selectively holding and releasing workpieces or parts at a transfer station. Still further, the apparatus 22 is illustrated and will be described below as a part loader with a transfer arm and gripper effecting the loading operation and with a discharge chute for unloading parts. The loading operation may obviously be reversed with the transfer arm and gripper serving a part unloading function. Workpieces or parts of a wide variety of configurations, sizes and dimensions can be accommodated by the apparatus.

The apparatus 22 performs workpiece or part storage, transport and transfer functions and includes a workpiece or part magazine having a plurality of workpiece receivers for storing a plurality of like workpieces. A magazine 24 illustrated in FIGS. 1 and 2 takes the form of an indexible rotary table-like member having work receivers movable through a second circular planar path having several stations at least one of which is a transfer station. As shown, a transfer station B is provided and the member or table 24 is indexible through a horizontal second planar path displaced from the path of the chuck, and spindle assemblies 14 by approximately 90°. Clockwise indexing movement may be assumed for the table 24 as indicated by arrow 27 in FIG. 1 and, when the apparatus serves a part loading function, the workpieces or parts may be loaded into the receivers on the table 24 by an operator at a loading station on an upstream side of the transfer station B, the parts being removed from the table at the station B and transferred to the machine 10 in timed relationship with the operation of the machine.

The workpiece or part receivers on the table 24 may vary as to configuration and number as required by the parts to be handled. A circumaxially spaced series of receivers illustrated take the form of part carriers or nest-like cavities 26, 26 for the gravity retention of parts 18, 18. The cavities or nests 26, 26 are so sized and shaped as to retain the parts 18, 18 in fixed orientation as placed therein by an operator of the apparatus and machine. The orientation of the parts is such that front portions thereof to be subsequently engaged by the chucks 16, 16 face downwardly. Rear portions of the parts are exposed upwardly for ready engagement by a transfer arm gripper at the transfer station B.

Referring particularly to FIG. 2, the table 24 is supported on and rotated by a vertical shaft 28 extending downwardly in a housing 30 for the workpiece storing and handling apparatus 22. At a lower end portion, the shaft 28 is connected with an operating means for the table 24 which is indicated generally at 32 and which may take the form of an appropriate electric motor, speed reducer, and brake means. Indexing movement of the table 24 by the operating means 32 is controlled by a limit switch 34 operatively associated with detents 36, 36 arranged in a circumaxially spaced series along a lower portion of the table. The limit switch 34 is connected by broken line 38 with a control 40 for the apparatus which may include electrical logic and other circuitry and may be of the relay or solid state type. Conventional circuitry in the control 40 is operable in timed relationship with the control for the machine 10 and quick disconnect electrical conductor means are preferably provided between the controls for the machine 10 and the apparatus 22.

The detents 36, 36 are equal in number with the nests 26, 26 for proper indexing of parts 18, 18 in the nests successively to the transfer station B. Further, a plurality of tables 24 are preferably provided with nests 26, 26 which may vary in size, shape and number as required for various parts. The detents 36, 36 on the several tables correspond in number and spacing with their associated nests 26, 26. Thus, with a ready disconnect provision between the tables 24, 24 and the shaft 28 a variety of parts can be accommodated by the apparatus 22 with rapid and efficient changeover.

It should be noted that the housing 30 is adapted for ready portability with four (4) wheels 42, 42, two shown, and a quick disconnect device operable with the frame of the machine 10. In FIG. 2, a bifurcated and apertured bracket 44 on the machine receives an apertured lug 46 on the apparatus housing 30 and connection may be effected by a drop pin 48. A similar device is provided at an opposite side of the housing 30 as illustrated in FIG. 1.

Figure 3:
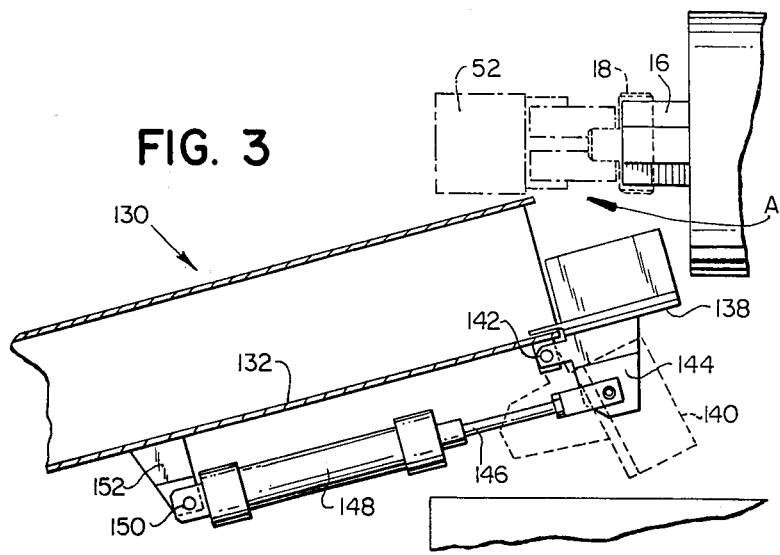
FIG. 3 is a fragmentary enlarged and somewhat schematic view of a single spindle and chuck in operative association with a work unloading means comprising a chute with a movable end portion.

The workpiece storing and the handling apparatus 22 also includes a transfer arm and gripper as mentioned above and a free end portion of arm 50 in FIGS. 1 and 2 is shown carrying a gripper 52. The transfer arm 50 and gripper 52 are shown in FIGS. 1 and 2 in full line at a first transfer position adjacent and above a part 18 in a nest 26 at the transfer station B. The arm extends generally horizontally and supports the gripper 52 with its operative elements facing downwardly for engagement with the upwardly exposed rear portion of the part 18 to be transferred from its nest to the gripper. On completion of transfer, the arm 50 is swung in a composite arcuate motion to the broken line position of FIGS. 1 and 2. The arm in this position is generally horizontal and the gripper 52 holds the part 18 facing the chuck 16, FIG. 1, for further linear movement of the arm and gripper to the transfer station A and for insertion of the part 18 into the chuck 16 in a loading operation. Thus, the broken line position of the arm 50 and gripper 52 in FIGS. 1–2, may be regarded as a "ready" position from whence the arm and gripper move to a second transfer position at the station A. Arrows 54, 54 in FIG. 2 indicate generally the composite arcuate movement of the arm 50 and gripper 52 from the first transfer position to the ready position and arrows 56, 56 in FIG. 1 indicate the linear movement of the arm and gripper from the ready position to the second transfer position at the station A. In FIG. 3, the gripper 52 is shown in broken line with a part 18 entered in the chuck 16 in a loading operation. Orientation of the part 18 is fixed during linear movement 56 of the arm 50 and gripper 52 for efficient loading of the part into the chuck 16. When the chuck 16 has gripped the part 18 the gripper 52 releases and the arm 50 and the gripper 52 return to the ready position of FIG. 1 and thence to the first transfer or full line position of FIGS. 1 and 2.

The workpiece gripper 52 is preferably electrically operable but otherwise may be any of the well known gripper types employing mechanical, magnetic or other gripping action. The gripper is controlled in its operation from the electronic circuitry in the control 40 to grip a part 18 at the station B, to transport the part to the ready position and thence to the transfer station A, and to release the part in the chuck 16. Alternatively, and if the apparatus 22 is employed in a part unloading operation, the control circuitry may be so designed as to cause the gripper to pick up a part at a chuck 16, transport the same and release the same in a nest 26 at the transfer station B.

At the ready or broken line position of FIG. 1, the arm 50 and gripper 52 are conditioned for precise and efficient part loading operation at the station A on completion of a simple linear movement of the arm and gripper. The arm and gripper, however, provide ample clearance for various tooling in the machine 10 so as not to interfere with machine operation and dwell time at the ready position is of course coordinated with machine operation and particularly with chuck release and hold operation by the control 40.

Figure 4:
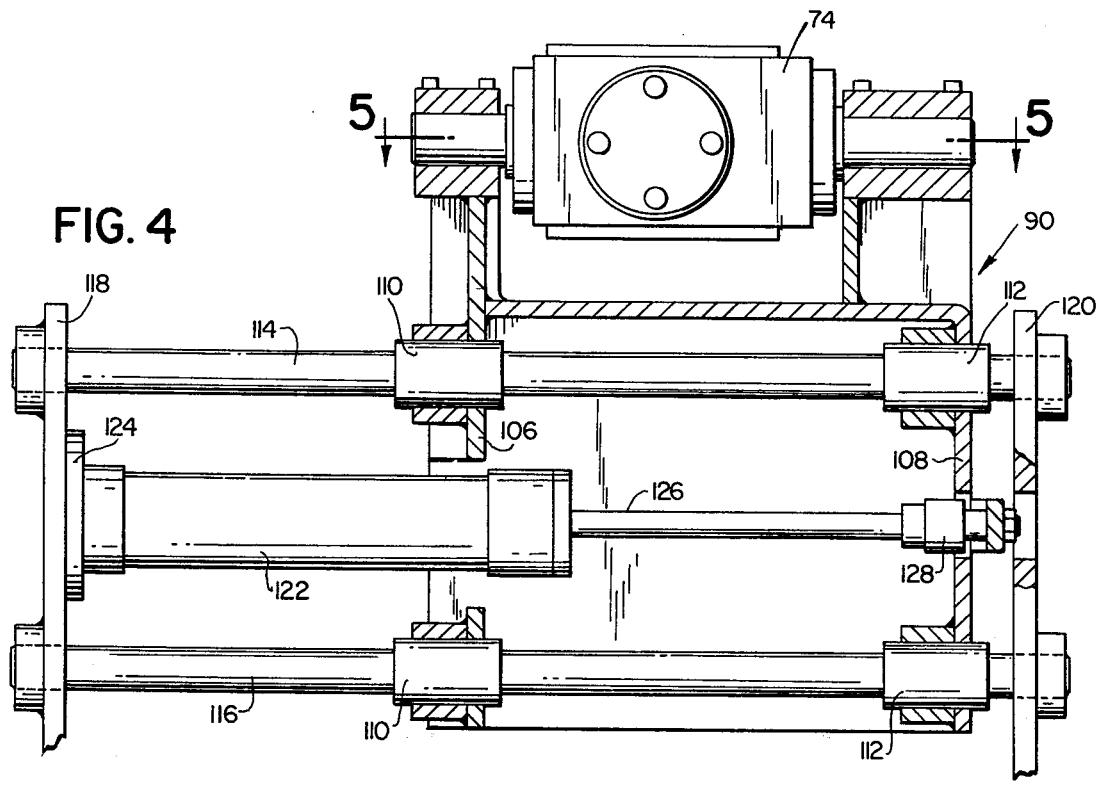
FIG. 4 is an enlarged fragmentary view in side elevation and partially in section showing a motion transmitting and power operating means for a transfer arm, and taken generally as indicated at 4—4 in FIG. 2.
Figure 5:
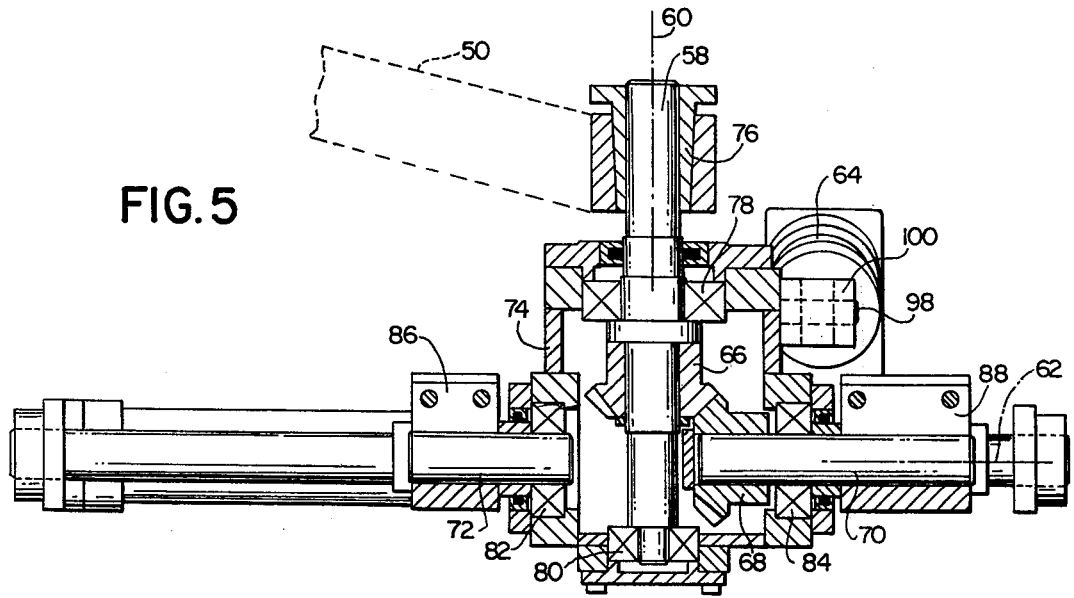
FIG. 5 is an enlarged fragmentary sectional view through a portion of the motion transmitting means of FIG. 4, and taken generally as indicated at 5—5 in FIG. 4.

In its composite arcuate movement between its first transfer position at the station B and its ready position, the transfer arm 50 is rotated about two discrete angularly related axes as stated. Motion transmitting and power operating means for the arm are best illustrated in FIGS. 4 and 5 and comprise a support and operating shaft 58 carrying the arm 50 at an end portion thereof opposite its free end portion. The shaft 58 is rotatable about its own axis 60 and is bodily swingable about a fixed axis 62, FIG. 5. Thus, the axis 60 is movable through an arc approximately in a vertical plane about the axis 62 and the shaft 58 is simultaneously rotated about the axis 60. As shown, the shaft 58 moves through an arc of approximately 90° in effecting the composite arcuate motion of the transfer arm and the shaft 58 is simultaneously rotated through an angle of approximately 90°, FIGS. 1 and 2. This effects the desired arm movement and simultaneously orients a part 18 held by the gripper 52 as required from its face down orientation in a nest 26 to its horizontally facing orientation at the ready position.

In accordance with the presently preferred practice the bodily swinging or rotating movement of the shaft 58 and the rotation thereof about its own axis 60 is provided for with a suitable gearing arrangement operable from and in response to a single power operating means in the form of a fluid operably cylinder 64.

The preferred gearing arrangement comprises first and second interengageable gears respectively fixed to the shaft 58 and fixed against rotation about the axis 62. A first gear 66 takes the form of a bevel gear engageable with a second bevel gear 68, the gears being respectively keyed or otherwise fixed on the shaft 58 and on a pivot pin or shaft 70. The pivot shaft 70 cooperates with a second coaxial pivot pin or shaft 72 to support a housing 74 for the gears 66, 68 and for the support shaft 58. The support shaft 58 projects from the housing as illustrated and is fixed to the transfer arm 50 as by means of a mounting sleeve 76. Axially spaced bearings 78, 80 support the shaft 58 in cantilever fashion for rotation about its axis 60 in the housing 74 and relative rotation between the housing and the pivot shafts 70, 72 is provided for by means of bearings 82, 84. At outboard ends, the shafts 70, 72 are secured in sleeves 86, 88 forming a part of a slidable carriage 90 to be described hereinbelow.

The fluid operable cylinder 64 is fixed at a lower end portion as best illustrated in FIG. 2 by means of a frame bracket 92 and has a pivotal connection at 94 with a small supporting bracket mounted on the bracket 92. An actuating rod 96 from the cylinder 64 extends to a connecting pin 98, FIG. 5, for a pivotal connection of the rod with the housing 74. A yoke 100 at the end of the actuating rod 96 effects the pivotal connection with the pin 98 and the actuating rod may thus assume a return position 102 in FIG. 2 for rotation of the housing 74 and for movement of the arm 52 to its first transfer position. In an extended or operative position 104 of the yoke 100 and rod 96 in FIG. 2, the housing 74 is rotated through approximately 90° about the axis 62, FIG. 5, and the transfer arm 50 and gripper 52 are moved to the ready position. As will be apparent, the bevel gears 66, 68 provide automatically operable rotating means for the shaft 58, turning the shaft 58 about its own swinging axis 60, on actuation of the cylinder 64 for movement of its actuating rod in one and an opposite direction. Actuation of the cylinder 64 is of course controlled from the electronic circuitry of the control 40.

The housing carriage 90, best illustrated in FIG. 4, has front and rear vertical frame members 106, 108 each of which carries a pair of sleeves 110, 110 and 112, 112. The sleeves 110, 112 are spaced horizontally and slidably mounted on upper and lower horizontal slide rods 114, 116 spaced apart vertically and secured at opposite ends by frame members 118, 120. Thus, the carriage 90 including the housing 74 and transfer arm 50 are movable linearly and in a horizontal direction leftwardly and rightwardly in FIGS. 4 and 5 whereby to effect the required linear horizontal movement of the transfer arm and gripper between the ready position and the transfer station A. Precise control over such movement is provided for by the slide rods and mounting sleeves for precise linear movement and maintenance of the required fixed orientation of a part 18 held by the gripper 52.

A fluid operable cylinder 122 forming a part of the power operating means for the transfer arm 50 has a left hand end portion fixed in FIG. 4 to the frame member 118. A movable actuating rod 126 associated with the cylinder has its free end portion connected with the frame member 108 at 128 whereby to translate the carriage 90 leftwardly and rightwardly in FIGS. 4 and 5. The operation of the cylinder 122 is of course controlled by electronic circuitry in the control 40 to effect movement of the transfer arm 50 as required between the ready position and the transfer position at the station A.

When the apparatus 22 is employed as a parts loader as illustrated and described above, it is the presently preferred practice to provide an unloading means as indicated generally at 130 in FIGS. 1 and 3. A means for receiving and transporting parts discharged by the chuck 16 at the transfer station A comprises a chute 132 inclined downwardly toward a discharge end 134 and mounted on the frame of the machine by means of a suitable bracket 136, FIG. 1. At an upper or part receiving end portion, the chute 132 has a movable end portion 138 which is disposed beneath the chuck 16 at the transfer station A in FIG. 3 and which is movable between the operative full line position shown and an inoperative broken line position at 140. In the operative position, the movable end portion 138 receives a part 118 in gravity fall from the chuck 16 and directs the same downwardly along the chute 132 for remote discharge. In the inoperative position 140 of the chute end portion 138, clearance is provided for indexing movement of the chuck 16.

The construction and arrangement of the discharge chute end portion 138 may vary but is preferably as illustrated in FIG. 3 with a hinge connection 142 between the chute end portion and the main body of the chute and a depending bracket 144 beneath the end portion 138 serving as an actuating means for swinging movement of the end portion 138. That is, the bracket 144 is pivotally connected with an actuating rod 146 associated with a fluid operable cylinder 148 pivotally mounted at 150 to a bracket 152 depending beneath the main body portion of the chute. As will be apparent, fluid cylinder 148 may be operated to selectively swing the end portion 138 of the chute between its operative and inoperative positions. Control of cylinder operation is exercised from the control circuitry of the apparatus 22 at 40.

As will be apparent from the foregoing, the workpiece storing and handling apparatus of the present invention provides for a desirably simple and efficient mechanism in storing, transferring, and transporting a plurality of workpieces or parts. Part loading and unloading operations are achieved with enhanced efficiency and a single machine operator can tend and monitor the operation of two or more machines of the multiple work holder type.

I claim:

1. A workpiece storing and handling apparatus adapted for use with a multiple work holder machine wherein the work holders are indexible successively in a first substantially vertical planar path through a plurality of stations at least one of which is a machining station and at least one of which is a transfer station, and wherein the work holders have alternative hold and release conditions for transferring a workpiece; said workpiece storing and handling apparatus comprising a magazine having a plurality of workpiece receivers for storing a plurality of like workpieces, means for indexing the magazine to successively move said receivers through a plurality of stations in a second substantially horizontal planar path displaced approximately 90 degrees from the planar path of said machine work holders, at least one of said receiver stations being a workpiece transfer station, a workpiece transfer arm having a free end portion swingable through an arc between a first transfer position adjacent said receiver transfer station and an intermediate ready position spaced from said work station and an intermediate ready position spaced from said work holder transfer station but in alignment therewith for linear movement toward and away from a second transfer position adjacent the station, a workpiece gripper at the free end portion of said transfer arm operable selectively to grip and release a workpiece for transport between said two transfer stations and for transfer thereat, and cooperative motion transmitting and power operating means operatively associated with an opposite end portion of said transfer arm, said motion transmitting means being operable by said power operating means to rotate said transfer arm about two discrete and angularly displaced axes in movement of its free end portion between said first transfer position and said ready position whereby said gripper at said free end portion of said arm is so oriented at said first transfer position as to face the plane of movement of the workpiece receiver stations and so oriented at said ready position as to face the plane of movement of said work holders, and said motion transmitting means being further operable by said power operating means to effect precise substantially horizontal linear movement of said free end portion of said arm and gripper between said ready position and said second transfer position adjacent said work holder transfer station, the orientation of said transfer arm fee end portion and gripper being fixed between said ready position and said second transfer position.

2. A workpiece storing and handling apparatus as set forth in claim 1 wherein said workpiece magazine takes the form of a rotatably indexible horizontal member having a circumaxially extending series of workpiece receivers in the form of carriers adapted to support workpieces such that front portions thereof engageable by said work holders face downwardly and rear portions thereof engageable by said gripper are exposed upwardly, and wherein said free end portion of said transfer arm is disposed vertically adjacent and above a workpiece so supported at said magazine transfer station when said arm is in said first transfer position, the gripper at said free end portion of said transfer arm being thus operatively engageable with said exposed rear workpiece portions.

3. A workpiece storing and handling apparatus as set forth in claim 2 wherein said workpiece carriers comprise means defining upwardly open workpiece receiving cavities, the workpieces being retained in position in their respective cavities by gravity.

4. A workpiece storing and handling apparatus as set forth in claim 2 wherein said apparatus is particularly adapted for a machine loading operation, and wherein said magazine has at least one workpiece loading station displaced horizontally from its said transfer station and on an upstream side of said transfer station relative to the direction of rotation of said rotatable horizontal member.

5. A workpiece storing and handling apparatus as set forth in claim 4 wherein said apparatus also includes workpiece unloading means operatively associated with said work holders at their said transfer station, said unloading means being adapted to receive workpieces released by said work holders in gravity transfer from the work holders, and being further adapted to transport said workpieces to a remote location for discharge.

6. A workpiece storing and handling apparatus as set forth in claim 5 wherein said unloading means includes a discharge chute having a workpiece receiving end portion adjacent said transfer station and a remote discharge end portion, said workpiece receiving end portion being movable relative to the remaining portion of the discharge chute and having operative and inoperative positions, the operative position being beneath a work holder at the transfer station and at least partially in the path of movement of the work holders, and the inoperative position being out of the said path of movement, and said unloading means also including power operating means for moving said chute end portion between its said operative and inoperative positions.

7. A workpiece storing and handling apparatus as set forth in claim 6 wherein said movable end portion of said discharge chute is pivotally connected with the remaining chute portion and swingable between said operative and inoperative positions, and wherein said power operating means comprises a fixed fluid operable cylinder having a movable actuating rod connected with and operable to swing said chute end portion between its said operative and inoperative positions.

8. A workpiece storing and handling apparatus as set forth in claim 7 wherein said motion transmitting means is adapted to rotate said transfer arm simultaneously about said two discrete axes in a composite arcuate motion between said first transfer position and said ready position.

9. A workpiece storing and handling apparatus as set forth in claim 8 wherein one of said two discrete axes is fixed and approximately horizontal and the other of said axes is swingable approximately in a vertical plane, said horizontal axis being substantially parallel with the linear movement of said free end portion of said transfer arm between said ready position and said second transfer position.

10. A workpiece storing and handling apparatus as set forth in claim 9 wherein said motion transmitting means includes a transfer arm support and operating shaft mounting said opposite end portion of said arm, said shaft being rotatable about said vertically swingable axis and being bodily swingable about said approximately horizontal axis, and wherein said motion transmitting means also includes shaft rotating mechanism operable in response to swinging movement of the shaft about said approximately horizontal axis.

11. A workpiece storing and handling apparatus as set forth in claim 10 wherein said motion transmitting means also includes means for bodily moving said transfer arm support shaft along said fixed approximately horizontal axis whereby to effect said linear movement of said transfer arm between said ready position and said second transfer position.

12. A workpiece storing and handling apparatus as set forth in claim 10 wherein said support shaft rotating mechanism comprises a pair of interengaging gears respectively fixed on the support shaft and fixed relative to said fixed approximately horizontal axis, and wherein said power operating means serves to swing said shaft bodily about said fixed axis whereby to cause the gears to simultaneously rotate the shaft about its own axis and to thereby effect said composite arcuate motion of said transfer arm.

13. A workpiece storing and handling apparatus as set forth in claim 12 wherein said motion transmitting means includes a housing mounting said transfer arm support shaft for rotation about said swingable axis and mounted itself for swingable movement about said fixed axis, said interengaging gears being disposed within said housing and said support shaft projecting from the housing and supporting the transfer arm externally thereof.

14. A workpiece storing and handling apparatus as set forth in claim 13 wherein said power operating means includes a fluid operable cylinder having a movable actuating rod connected with said housing to swing the same about said fixed axis whereby to cause said gears to rotate said support shaft about said swingable axis and to effect said composite arcuate movement of said transfer arm.

15. A workpiece storing and handling apparatus as set forth in claim 14 wherein said fluid operable cylinder is adapted to swing said housing through approximately 90° about said fixed axis, and wherein said gears are adapted to simultaneously rotate said support shaft through approximately 90°.

16. A workpiece storing and handling apparatus as set forth in claim 15 wherein said motion transmitting means also includes a horizontally movable carriage on which said housing is mounted both for movement therewith and movement relative thereto, said housing in its relative movement being swingable about said fixed axis and in its movement with the carriage being translated linearly along said fixed axis.

17. A workpiece storing and handling apparatus as set forth in claim 16 wherein said power operating means includes a second fluid operable cylinder having a movable actuating rod connected in driving relationship with said carriage.

18. A workpiece storing and handling apparatus as set forth in claim 18 wherein said housing is swingably mounted on said carriage with at least one pivot pin for the housing arranged on said fixed axis, and wherein at least one horizontally extending slide rod is provided for mounting the carriage for its said linear movement.

19. A workpiece storing and handling apparatus as set forth in claim 1 wherein said apparatus is adapted for portable operation as a self-powered and self-contained unit, and wherein detachable connecting means are provided between said multiple work holder machine and said apparatus.

* * * * *

UNITED STATES PATENT AND TRADEMARK OFFICE
CERTIFICATE OF CORRECTION

PATENT NO. : 4,193,727

DATED : March 18, 1980

INVENTOR(S) : Wolfgang Kesselring

It is certified that error appears in the above-identified patent and that said Letters Patent are hereby corrected as shown below:

Column 11, line 2 "18" should be --17--

Signed and Sealed this

Seventeenth Day of June 1980

[SEAL]

Attest:

Attesting Officer

SIDNEY A. DIAMOND

Commissioner of Patents and Trademarks